US009431004B2

(12) United States Patent
Bohrer et al.

(10) Patent No.: US 9,431,004 B2
(45) Date of Patent: Aug. 30, 2016

(54) VARIABLE-DEPTH AUDIO PRESENTATION OF TEXTUAL INFORMATION

(71) Applicant: INTERNATIONAL BUSINESS MACHINES CORPORATION, Armonk, NY (US)

(72) Inventors: Patrick J. Bohrer, Cedar Park, TX (US); Michael D. Kistler, Austin, TX (US); Ramakrishnan Rajamony, Austin, TX (US); Mark W. Stephenson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 232 days.

(21) Appl. No.: 14/019,102

(22) Filed: Sep. 5, 2013

(65) Prior Publication Data

US 2015/0066510 A1    Mar. 5, 2015

(51) Int. Cl.
| | |
|---|---|
| *G06F 17/00* | (2006.01) |
| *G10L 13/04* | (2013.01) |
| *G10L 13/08* | (2013.01) |
| *G10L 13/00* | (2006.01) |
| *H04L 29/06* | (2006.01) |
| *H04N 21/61* | (2011.01) |

(52) U.S. Cl.
CPC .............. *G10L 13/043* (2013.01); *G10L 13/00* (2013.01); *G10L 13/08* (2013.01); *H04L 65/4069* (2013.01); *H04L 65/4084* (2013.01); *H04L 65/604* (2013.01); *G10L 13/04* (2013.01); *H04N 21/6125* (2013.01)

(58) Field of Classification Search
CPC ..................................................... G10L 13/00
See application file for complete search history.

(56) References Cited

U.S. PATENT DOCUMENTS

| | | | |
|---|---|---|---|
| 6,115,686 A | 9/2000 | Chung et al. | |
| 2004/0049389 A1* | 3/2004 | Marko et al. ................. | 704/260 |
| 2005/0108754 A1* | 5/2005 | Carhart ............... | H04H 20/103 |
| | | | 725/47 |
| 2009/0157407 A1 | 6/2009 | Yamabe et al. | |
| 2010/0153846 A1* | 6/2010 | Roy .............................. | 715/716 |
| 2012/0278082 A1* | 11/2012 | Borodin ............ | G06F 17/30873 |
| | | | 704/260 |
| 2013/0080445 A1* | 3/2013 | Gogan .............. | G06F 17/30053 |
| | | | 707/748 |
| 2013/0287212 A1* | 10/2013 | Marko et al. .................... | 381/2 |

OTHER PUBLICATIONS

Z. Fiala et al., "A Component-Based Approach for Adaptive Dynamic Web Documents," Journal of Web Engineering, vol. 2, No. 1&2, pp. 58-73 (2003), accessed from 10.1.1.5.497 on Jul. 2, 2013.

(Continued)

*Primary Examiner* — Keith Bloomquist
(74) *Attorney, Agent, or Firm* — Brian F. Russell; Steven L. Bennett

(57) ABSTRACT

A respective sequence of tracks of Internet content of common subject matter is queued to each of a plurality of stations, where each of the tracks of Internet content resides on a respective Internet resource in textual form. In response to receiving a sample input, snippets of each of multiple tracks queued to a selected station among the plurality of stations is transmitted for audible presentation as synthesized human speech, where each of the snippets includes only a subset of a corresponding track. Thereafter, one or more complete tracks among the multiple tracks for which snippets were previously transmitted are transmitted for audio presentation as synthesized human speech.

14 Claims, 8 Drawing Sheets

(56) References Cited

OTHER PUBLICATIONS

Odiogo, Text-to-speech RSS generator, Jul. 20, 2011—http://blog.odiogo.com/index.php/2011/07/20/press-release-odiogo-launches-talking-netvibes-powered-by-odiogo-the-first-app-that-makes-iphones-read-personal-news-selections-from-netvibes-dashboards/.

Cunningham, Gear & Gadgets/Product News and Review, Aug. 31, 2012—http://arstechnica.com/gadgets/2012/08/review-androids-google-now-can-teach-siri-a-few-tricks/ and http://lifehacker.com/5950162/how-to-turn-your-phone-into-a-mind+reading-personal-assistant.

RSS feed generator, Date of download: Sep. 5, 2013—http://www.feedity.com/.

Zukerman, BlogRadio, Jun. 7, 2010—http://downloadsquad.switched.com/2010/06/07/blogradio-is-a-text-to-speech-rss-feed-reader/.

Dobie, Webtalks, Feb. 15, 2011—http://www.androidcentral.com/webtalks-brings-text-speech-your-feeds.

RSS Voice Reader, Date of download: Sep. 5, 2013—http://www.rss-voice-reader.com/.

ReadSpeaker, Date of download: Sep. 5, 2013—http://www.readspeaker.com/readspeaker-podcaster/.

ZAPP TEK, iSpeak It, Apr. 10, 2010—http://download.cnet.com/iSpeak-It/3000-2140_4-10379572.html.

Various Text-to-Speech (TTS) applications, Date of download: Sep. 5, 2013—http://www.howtogeek.com/125305/the-best-text-to-speech-tts-software-programs-and-online-tools/.

\* cited by examiner

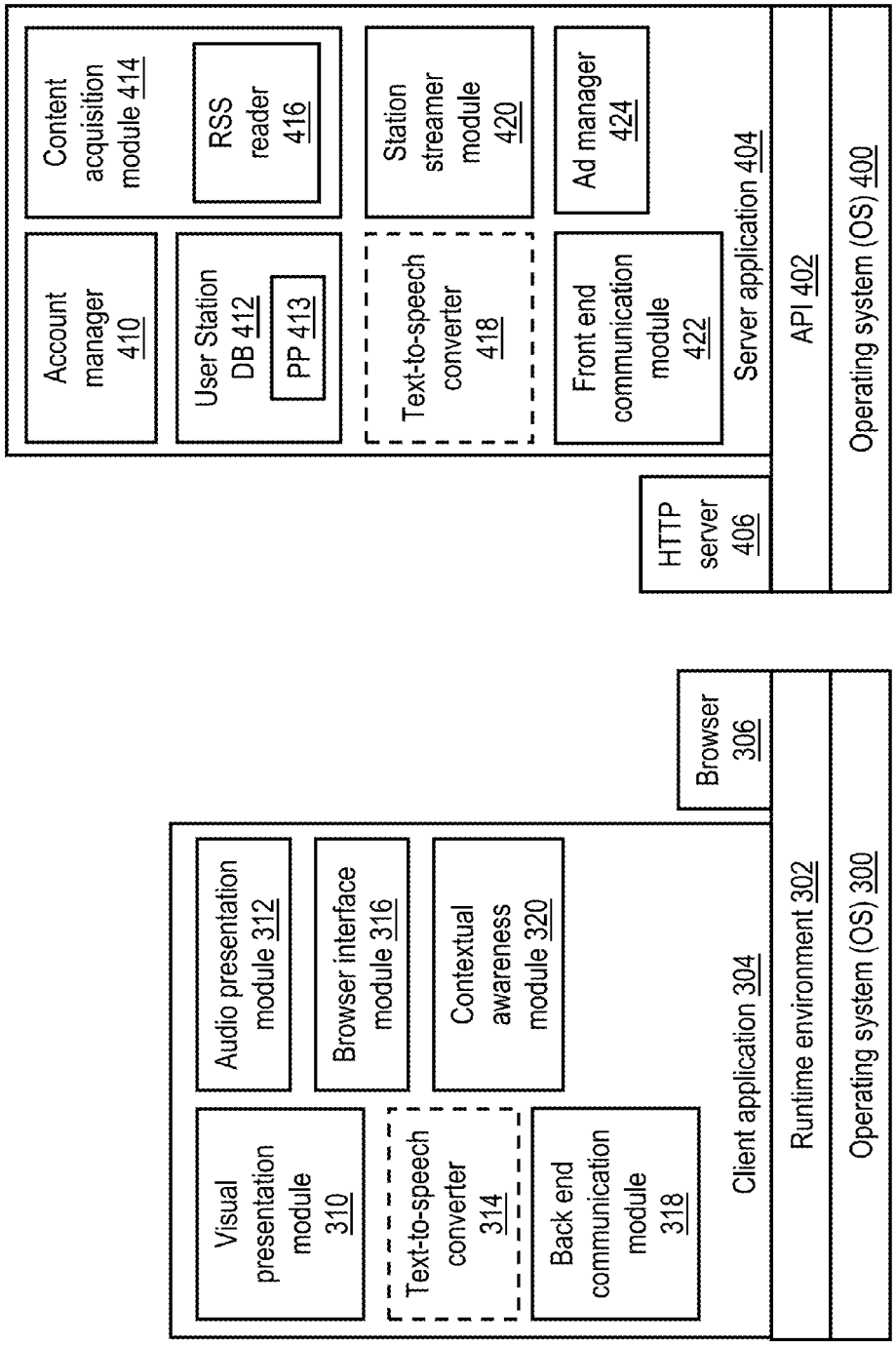

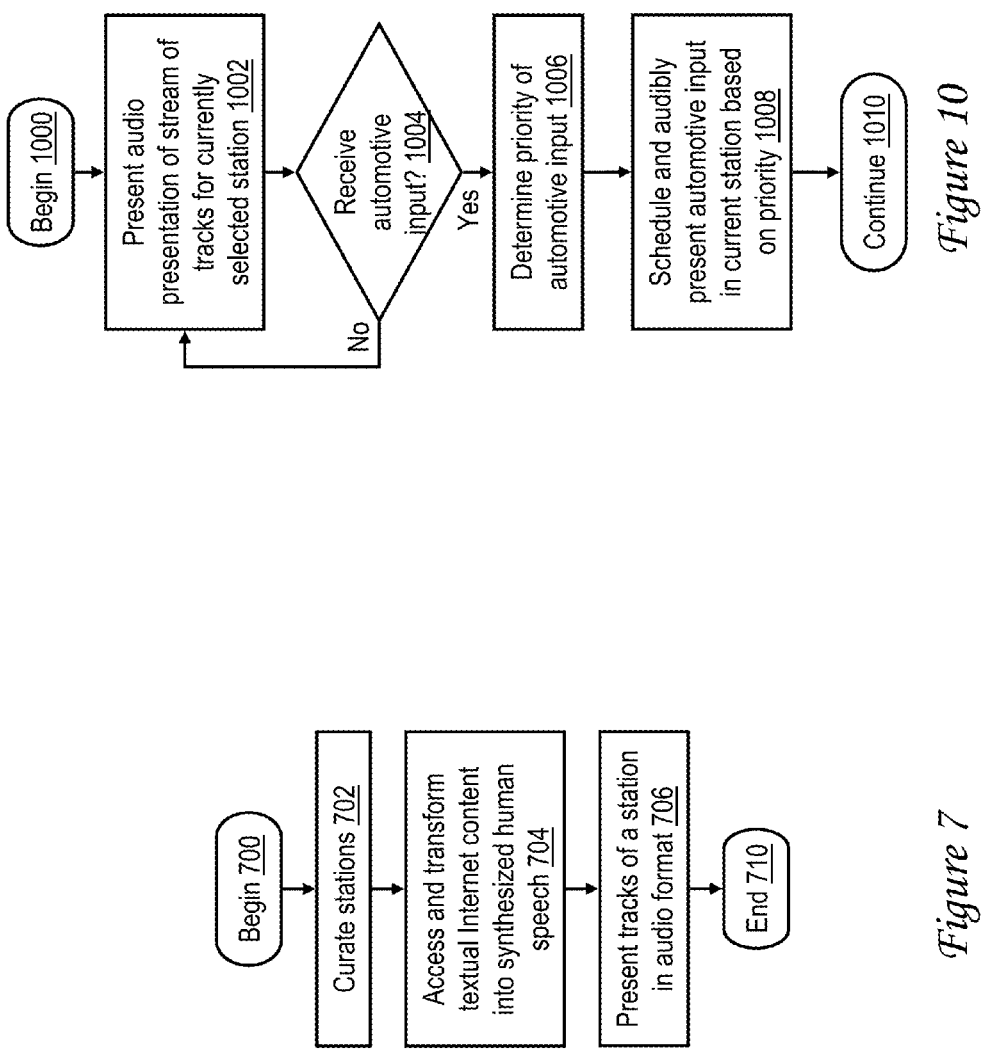

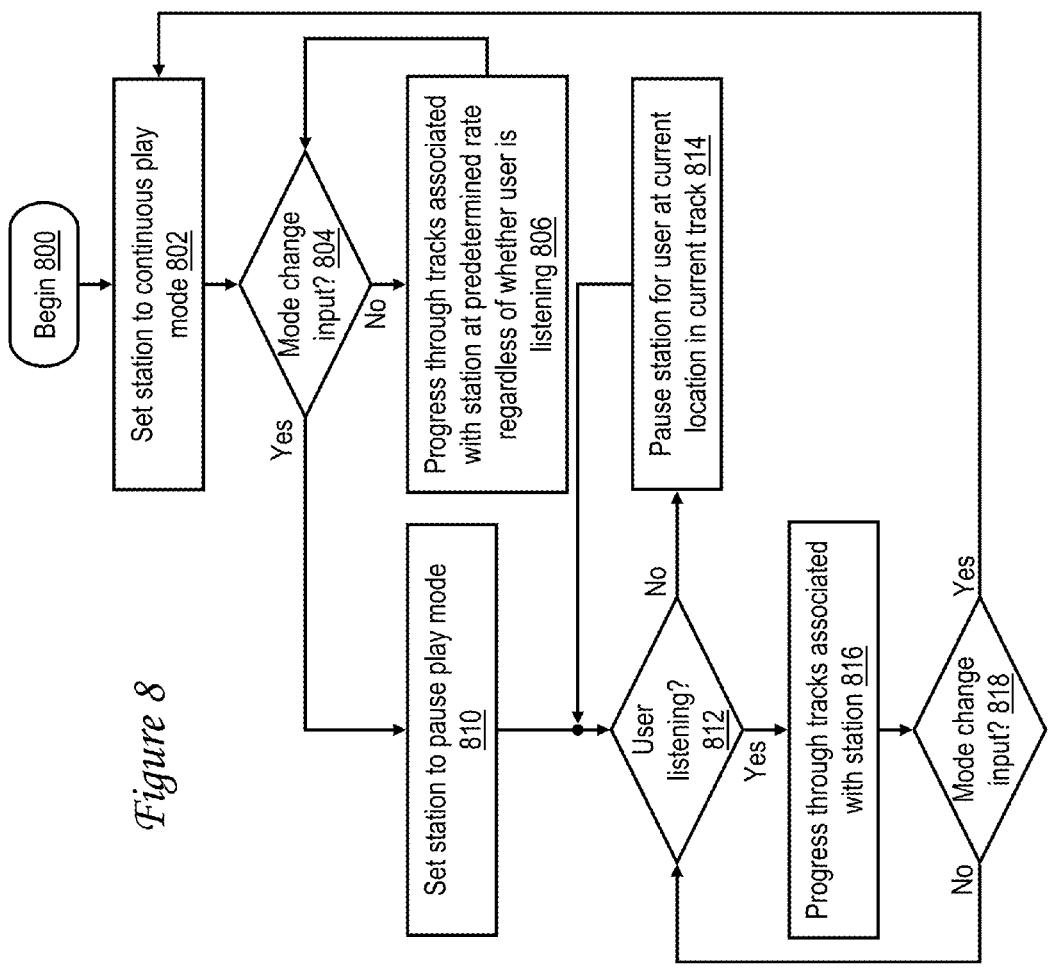

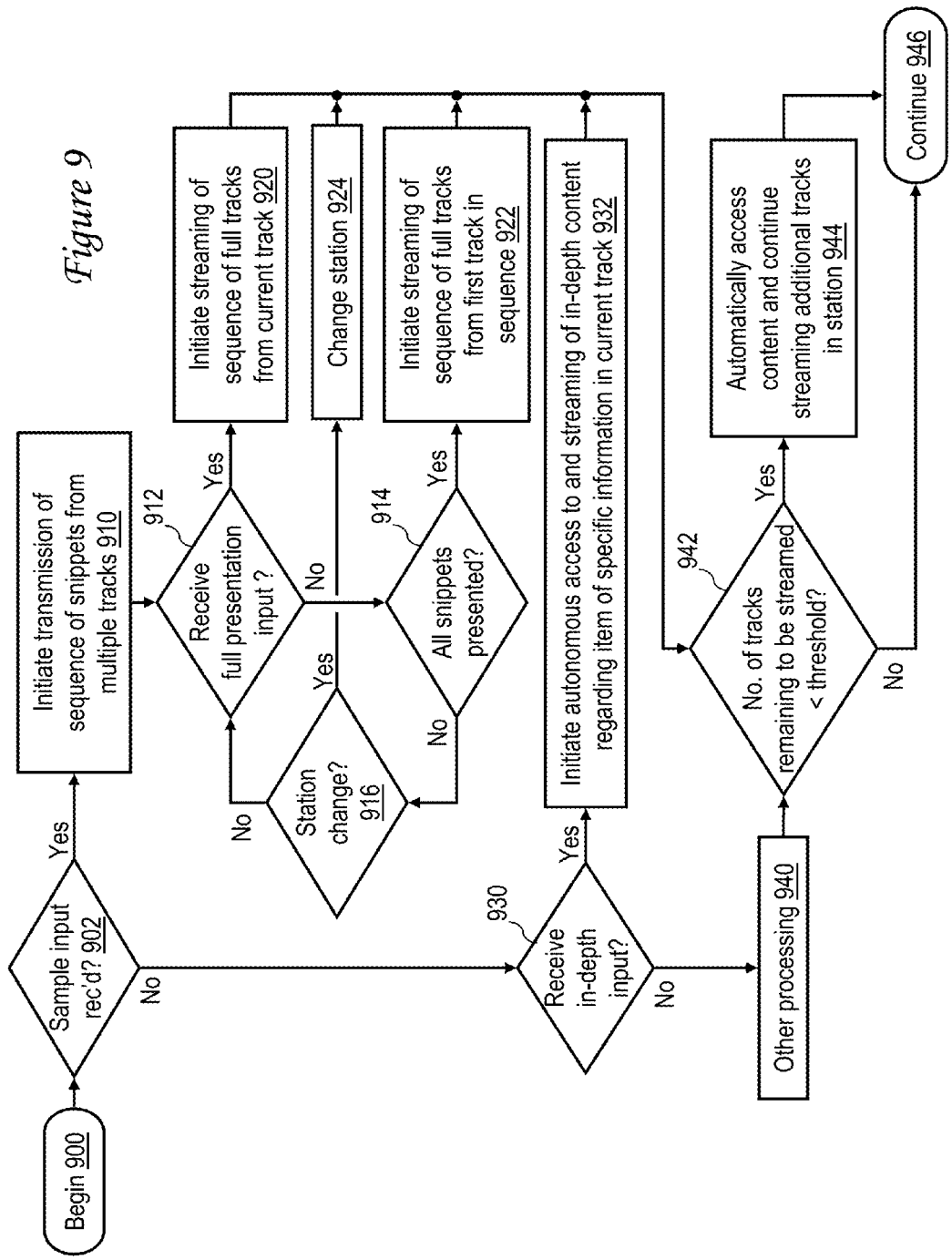

VARIABLE-DEPTH AUDIO PRESENTATION OF TEXTUAL INFORMATION

BACKGROUND OF THE INVENTION

The present invention relates to data processing, and more specifically, to personalized audio presentation of textual information as synthesized human speech.

As data processing systems such as computers, mobile phones, cameras, gaming systems, vehicle computers and the like have become pervasive, users of such data processing systems have come to expect and rely upon access, via the Internet, to various resources, such as information, executable programs and services. The resources accessible via the Internet include, for example, news and weather reports, financial information and financial transactions, various applications ("apps"), mapping services, data backup, management and storage services, video and audio entertainment, information services and feeds, and various knowledge bases (e.g., dictionaries, encyclopedias, real estate listings, etc.). User access to these and other resources available via the Internet is encouraged by making many of these resources available at low or no cost to the user.

Although resources accessible via the Internet commonly include or are provided in conjunction with image and/or video content, a significant proportion of the resources accessible via the Internet are provided as, or in conjunction with, textual content. Consequently, many of the resources of the Internet have been effectively inaccessible or unusable by users that are either temporarily or permanently unable to read such textual content, for example, due to the temporary inability of the user to view the textual content (e.g., while driving an automobile) or visual impairment of the user.

BRIEF SUMMARY

In at least some embodiments, a user's access to the textual content of resources available on the Internet is promoted by enabling a personalized audio presentation of the textual content as synthesized speech.

In at least some embodiments, each of a plurality of stations has a respective sequence of tracks of Internet content of common subject matter and a respective play pointer indicating a location in the sequence of tracks. In response to a first input, the presentation mode of the station is configured in a continuous play mode in which the play pointer is progressed through the sequence of tracks queued to the station regardless of whether or not the station is presently selected for presentation. In response to a second input, the presentation mode is configured in a pause play mode in which the play pointer is progressed through the sequence of tracks queued to the station only while the station is selected for presentation to a user and otherwise pauses progression of the play pointer. The processor transmits tracks of the station and progresses the play pointer in accordance with the configured presentation mode.

In at least some embodiments, a respective sequence of tracks of Internet content of common subject matter is queued to each of a plurality of stations, where each of the tracks of Internet content resides on a respective Internet resource in textual form. In response to receiving a sample input, snippets of each of multiple tracks queued to a selected station among the plurality of stations is transmitted for audible presentation as synthesized human speech, where each of the snippets includes only a subset of a corresponding track. Thereafter, one or more complete tracks among the multiple tracks for which snippets were previously transmitted are transmitted for audio presentation as synthesized human speech.

In at least some embodiments, a selected track among the sequence of tracks queued to a selected station among the plurality of stations includes multiple items of specific information all related to the common subject matter of the selected station. In response to receiving an in-depth input during presentation of the selected track as synthesized human speech, automatically searching for and accessing additional textual Internet content concerning one of the multiple items of specific information and queuing the additional Internet content to the selected station for presentation in one or more additional tracks.

BRIEF DESCRIPTION OF THE SEVERAL VIEWS OF THE DRAWINGS

FIG. 3 is a software layer diagram of an exemplary software configuration of the data processing system of FIG. 2;

FIG. 4 is a software layer diagram of an exemplary software configuration of the server computer system of FIG. 1;

FIG. 7 is a high level block logical flowchart of an exemplary method of audio presentation of textual content of an Internet resource as synthesized human speech in accordance with one embodiment;

FIG. 8 is a high level block logical flowchart of an exemplary method of controlling a presentation mode of an audio presentation of textual content of an Internet resource;

FIG. 9 is a high level logical flowchart of an exemplary method of presenting a variable-depth audio presentation of textual content of an Internet resource; and FIG. 10 is a high level logical flowchart of an exemplary method of audibly presenting an automotive input in accordance with one embodiment.

DETAILED DESCRIPTION

Figure 1:
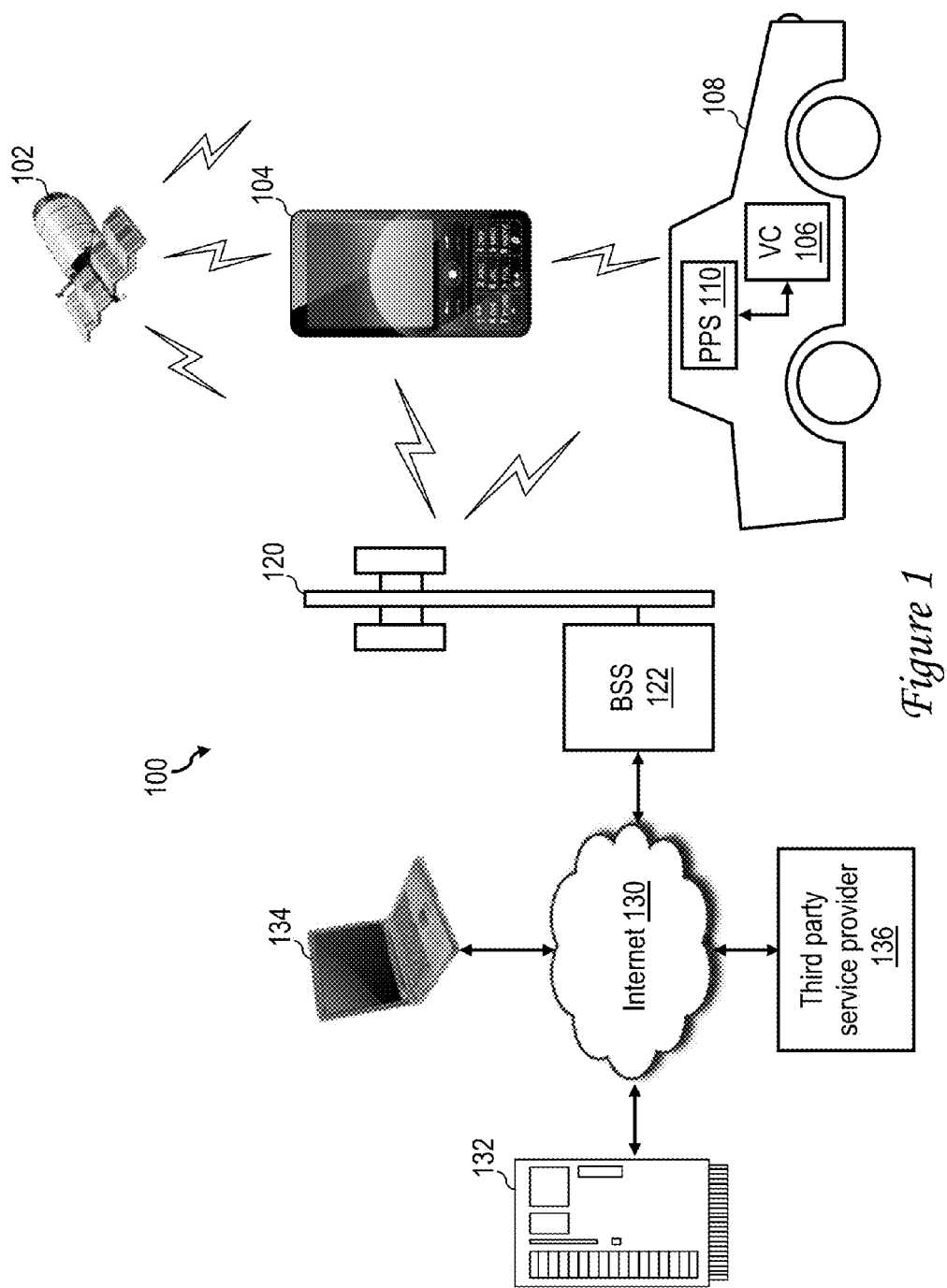
FIG. 1 is a high level block diagram of a data processing environment in accordance with one embodiment.

With reference now to the figures and with particular reference to FIG. 1, there is illustrated a high level block diagram of an exemplary embodiment of a data processing environment in which the methods, systems, and program products of the present invention may advantageously be practiced. In particular, FIG. 1 illustrates an environment 100 in which one or more data processing systems may be utilized to provide personalized audio presentation of textual information of an Internet resource as described herein.

As shown, environment 100 includes a constellation of earth-orbiting global positioning system (GPS) satellites 102. As is known in the art, GPS satellites 102 continuously emit GPS signals, which enable GPS-equipped devices, such as mobile phone 104, vehicle computer (VC) 106 of automobile 108 and/or client computer system 134 (a laptop, tablet, etc.), to continuously determine their position, velocity, bearing and elevation as long as a sufficient number of GPS satellites 102 can be acquired.

Environment 100 further includes a wireless wide-area network (WAN) communication system including a plurality of geographically distributed communication towers 120 and base station systems (BSSs) 122 (only one of each is illustrated for simplicity). Communication towers 120 includes one or more antennae supporting long range two-way radio frequency communication with wireless devices, such as mobile phone 104, vehicle computer 106 and/or client computer system 134. In various implementations, the radio frequency communication may conform to any known or future developed wireless protocol, for example, CDMA, GSM, EDGE, 3G, 4G LTE, IEEE 802.x (e.g., IEEE 802.16 (WiMAX)), etc. The information transmitted over-the-air by BSS 122 and cellular communication tower 120 to mobile phone 104, vehicle computer 106 and/or client computer system 134 may be further transmitted to or received from one or more additional circuit-switched or packet-switched communication networks, including, for example, the Internet 130.

As is well known to those skilled in the art, Internet 130 is a worldwide collection of servers, routers, switches and transmission lines that employ the Internet Protocol (IP) to communicate data. Internet 130 may be employed to communicate data between any of server computer system 132, client computer system 134, third party service provider 136, mobile phone 104, and vehicle computer 106. For example, as described further below, Internet 130 may be utilized to communicate to mobile phone 104, vehicle computer 106 and/or client computer system 134 information retrieved from or accessed through Internet 130 for presentation in audio format as synthesized speech.

As further shown in FIG. 1, vehicle computer 106 commonly has an associated passenger presentation system (PPS) 110 through which graphical, textual, video and audio presentations can be made to passengers of automobile 108. PPS 110 may thus include one or more dashboard, overhead or seatback displays and a speaker system. In many embodiments, the information presented by PPS 110 can be received over-the-air by a mobile phone 104 and then routed to PPS 110 for presentation via a wired or wireless (e.g., Bluetooth®) connection between mobile phone 104 and vehicle computer 106. In other embodiments, vehicle computer 106 may itself receive the information over-the-air from a communication tower 120.

Figure 2:
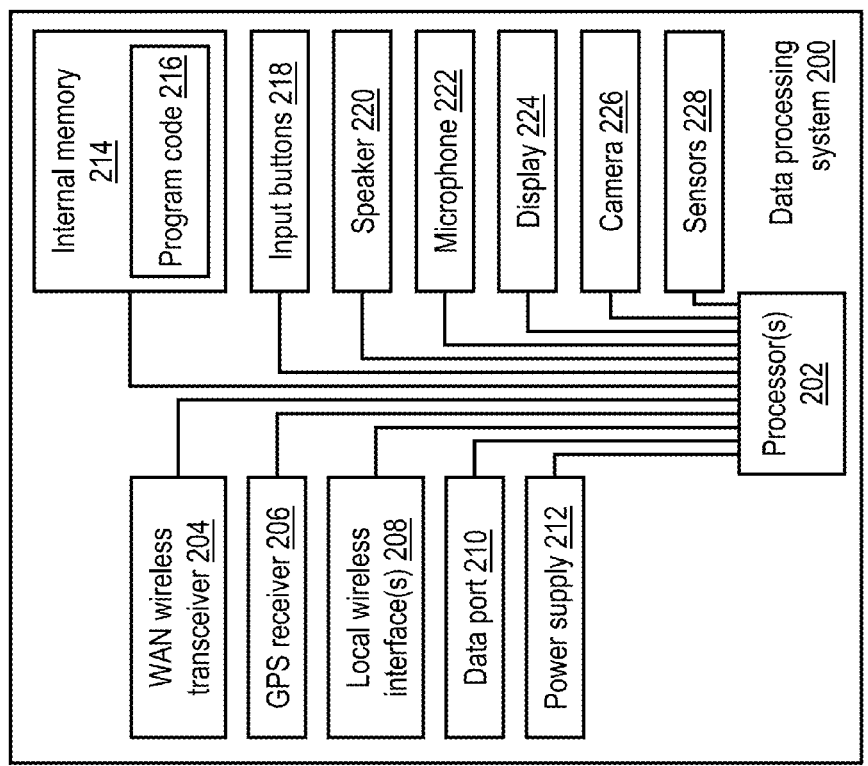
FIG. 2 is a high level block diagram of a data processing system in accordance with one embodiment.

Referring now to FIG. 2, there is illustrated a high level block diagram of an exemplary data processing system 200 in accordance with one embodiment. Data processing system 200 may be implemented as a special purpose device or may alternatively be realized on a conventional portable device platform, such as a mobile phone 104, vehicle computer 106 or client computer system 134, or on another data processing device platform, such as an MP3 player, digital camera, PDA, etc.

As illustrated, data processing system 200 includes one or more processors 202 that control the operation of data processing system 200 in accordance with program code 216 described further below with respect to FIG. 3. Data processing system 200 includes an internal memory 214 for storing program code 216, as well as various other data and information. As will be appreciated, the storage provided by internal memory 214 may be further augmented by a removable storage device (e.g., memory card, flash storage device, CD-ROM, etc.). The data stored in internal memory 214 may include, for example, synthesized human speech tracks that present in audio format textual information resident in Internet 130.

As shown, processor(s) 202 are coupled, either directly or indirectly, to a variety of other components of data processing system 200. These components include a WAN wireless transceiver 204 that supports two-way wireless WAN communication with communication towers 120 and a GPS receiver 206 that receives GPS signals from GPS satellites 102. In addition, to support communication with other electronics within close range, data processing system 200 may be further equipped with one or more local wireless interface(s) 208 (e.g., supporting 802.11x, Bluetooth®, 900 MHz communication or the like) and an optional data port 210, which may employ short range wired or wireless communication (e.g., RS-232, Ethernet, or infrared). Utilizing such technologies, data processing system 200 may communicate data received by WAN transceiver 204, local wireless interfaces 208 and/or data port 210 to another data processing system for processing and/or presentation.

Data processing system 200 is further equipped with a power supply 212 that powers processor(s) 202 and the other components of data processing system 200. In some embodiments, power supply 212 includes a battery and may further have an associated power port through which the battery may be charged from an AC or DC power source. Data processing system 200 may further include a number of input/output (I/O) devices, including input buttons 218, a speaker 220, a microphone 222, a display 224 (e.g., a LCD (liquid crystal display) or OLED (organic light-emitting diode) display without or without a touch screen), one or more video and/or still digital cameras 226, and optionally one or more additional sensors 228 (e.g., accelerometers and magnetometer (compass)).

Although not separately illustrated, those skilled in the art will appreciate that server computer system 132 can have a similar hardware configuration to data processing system 200 and will generally include one or more processors for executing program code, data storage coupled to the processor(s) for storing program code and data, and a network interface coupled to the processor(s). It may also generally exclude some of the input devices and sensors shown in DPS 200.

With reference now to FIG. 3, there is illustrated a layer diagram of an exemplary software configuration of data processing system 200 of FIG. 2 in accordance with one embodiment of the present invention. As illustrated, the software configuration of data processing system 200 includes, at a lowest level, an operating system (OS) 300 that provides a collection of services, such as thread scheduling, memory management, interrupts, etc., that may be accessed by higher-level software. Running on top of operating system 300 may be an optional runtime environment 302, such as one of the JAVA® or BREW® runtime environments. Finally, the software configuration of data processing system 200 includes a client application 304 and optionally a browser 306 running on top of operating system 300 and, if present, runtime environment 302. In various embodiments, client application 304 may be preinstalled on data processing system 200 or may be downloaded to data processing system 200 from server computer system 132 or a third party service provider 136, for example, over-the-air via the wireless WAN and WAN wireless transceiver 204 and/or Internet 130.

As illustrated, client application 304 comprises a number of individual modules, each executed to perform a function of data processing system 200. Those skilled in the art will appreciate that the illustrated modules are illustrative rather than exhaustive, and that client application 304 may include additional or alternative modules to support or extend the functionality of data processing system 200.

Figure 6:
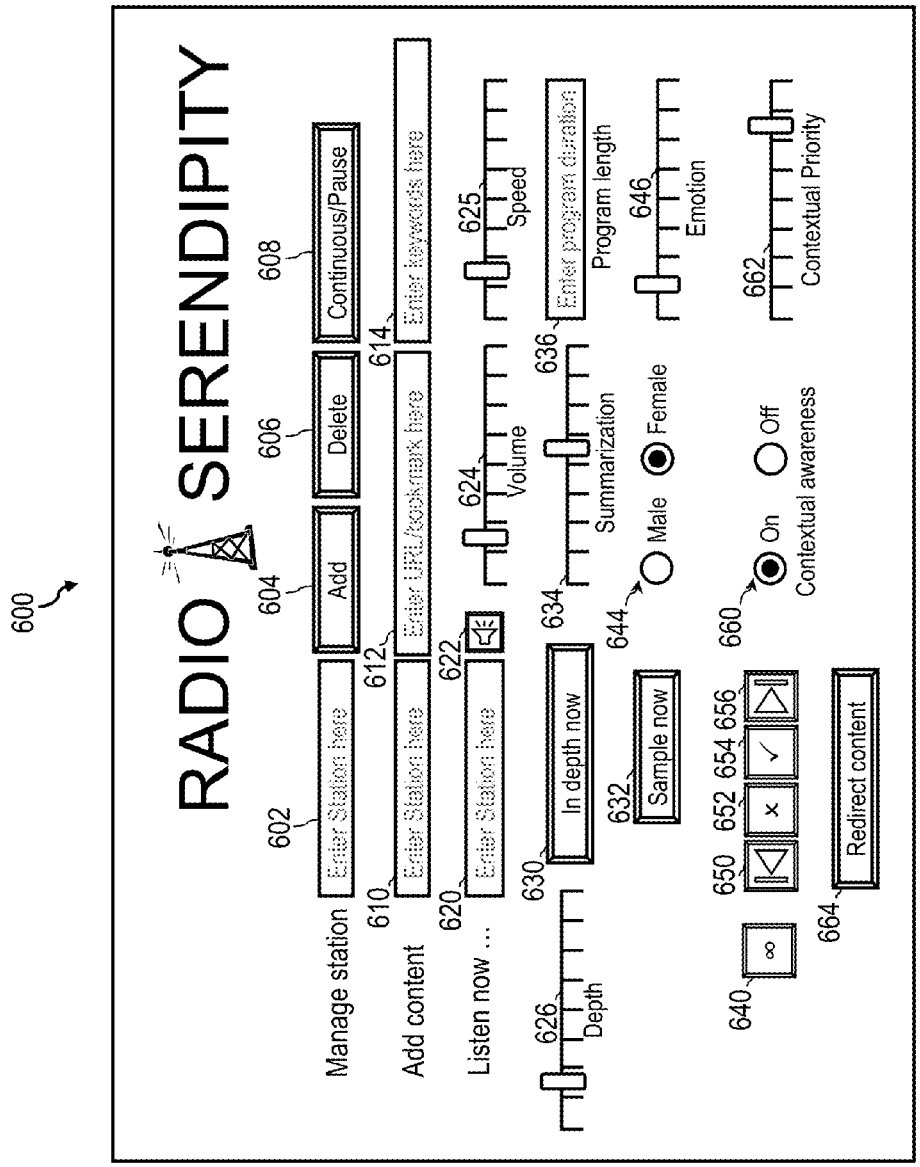
FIG. 6 depicts an exemplary graphical user interface of a client application or browser though which a user can control the audio presentation of textual content of an Internet resource.

As shown in FIG. 3, the modules within client application 304 preferably include a visual presentation module 310 that manages the presentation of a graphical user interface of client application 310 within display 224 and handles inputs received via the graphical user interface. An exemplary graphical user interface that may be presented by client application 310 or browser 306 is depicted in FIG. 6.

An audio presentation module 312 is preferably equipped to audibly present, as synthesized human speech, textual information of a resource resident in or accessed from Internet 130 (or another network). The textual information in each resource (e.g., web page, email message, blog post, Twitter® tweet, Facebook® post) forms an individual audio track. In some embodiments, audio presentation module 312 may present audio tracks directly from audio files, such as MP3 or MP4 files, received from server computer system 132. In other embodiments, client application 304 may receive information to be presented by audio presentation module 312 in an alternative format, such as a textual format. In such embodiments, client application 304 includes a text-to-speech converter 314, and audio presentation module 312 presents, in audio format, audio files and/or audio streams received from text-to-speech converter 314 following conversion of the information. As will be appreciated, text-to-speech converter 314 may also provide automated language translation of textual content from a source human language to a receptor human language, and such translation can be subject to user configuration.

Client application 304 preferably further includes a browser interface module 316 that receives from browser 304 designations of textual information accessed via browser 304 that the user desires to be audibly presented as synthesized human speech by client application 304. Illustrative techniques by which the textual information can be designated by a user are described in greater detail below with reference to FIG. 5.

A backend communication module 318 supports communication between client application 304 and a server application 404 (see, e.g., FIG. 4) running on server computer system 132. Backend communication module 318 receives information from resources in or accessed from Internet 130 and, if the information is in a textual format, passes the information to text-to-speech converter 314, and if the information has already been converted from a textual format into an audio format (e.g., by server application 404), passes the information directly to audio presentation module 312. Backend communication module 318 also communicates to server application 404 application settings, preferences and inputs received by client application 304.

Client application 304 optionally but preferably includes a contextual awareness module that receives substantially real-time contextual information (e.g., GPS and/or WAN location information, time information, automotive inputs provided by automobile 108, weather information, news information, route information from a mapping service, video or still camera inputs, etc.). Based on the content and priority of the contextual information, contextual awareness module 320 may provide one or more tracks of contextual information to audio presentation module 312 for inclusion within (e.g., interruption of) the sequence of audio tracks presented by audio presentation module 312. An exemplary method of presenting automotive inputs in a stream of audio tracks of Internet content is described in greater detail below with reference to FIG. 10.

Referring now to FIG. 4, there is depicted a layer diagram of at least a portion of an exemplary software configuration of server computer system 132 of FIG. 1. In some embodiments, server computer system 132 may optionally implement one or more unillustrated lower-level software or virtualization layers (e.g., a virtual machine manager (VMM)). At a still relatively low level, the software configuration of server computer system 132 further includes an operating system (OS) 400, which is preferably one of the commercially available operating systems, such as Windows®, UNIX®, LINUX®, AIX®, etc. OS 400 has an associated application programming interface (API) 402 though which middleware (if present) and application programs may access the services of OS 400.

Running on top of OS 400 is a hypertext transport protocol (HTTP) server 406, which, as is well known in the art, communicates data over Internet 130 utilizing HTTP. In particular, HTTP server 406 supports data communication with mobile phone 104, client computer system 134, and vehicle computer 106 utilizing HTTP. Communication with server computer system 132 may alternatively or additionally be conducted utilizing a sockets layer interface or other lower layer protocol running over IP.

Also running on top of OS 400 is a server application 404 that supports audio presentation by client application 304 and/or browser 306 of personalized streams of Internet content formatted as synthesized human speech. As a organizational construct, server application 404 preferably employs a "station" model according to which Internet content having related subject matter is associated, by users and/or server application 404, with various "stations" ("channels") loosely analogous to over-the-air broadcast radio stations or television channels. Although server application 404 may offer predefined stations (e.g., Daily News, Weather, Sports, Movie Reviews, etc.), server application 404 preferably permits users to define and curate the contents of their own personal or shared stations, and/or permits users to subscribe to stations curated or shared by others. Thus, each individual station's content may be as encompassing or as specific as desired by the user(s) having permission to curate the individual stations.

In the depicted embodiment, server application 404 includes a number of different modules that support the audio presentation service. In the depicted embodiment, these modules include an account manager 410 that manages accounts, including the credentials, permissions, feature sets, service levels, etc., of various users of the audio presentation service supported by server application 404. Thus, server application 404 may offer the service to a plurality of users forming a user community, may restrict the service (or at least some features of the service) to users that have been issued login IDs and passwords for accessing server application 404, and may further offer the service (or at least some features of the service) in exchange for a subscription fee. Account manager 410 may use the commonly used OAuth protocol to enable users to log in using credentials already established at other web services such as Google, Facebook, or Twitter.

Server application 404 maintains associations between the various subject matters of Internet content and a plurality of user-defined stations in a user station database 412. User station database 412 additionally stores, for each station, the configuration of the station and a play pointer 413 indicating a current location in a track from which Internet content is to be streamed. Server application 404 additionally implements a content acquisition module 414 that autonomously and continuously searches Internet 130 and accesses freely available or subscription-based textual content for presentation to users via the stations. To avoid "dead air," content acquisition module 414 preferably prioritizes the acquisition of content for stations currently being listened to by users via client applications 304 and/or browsers 306, but additionally preferably acquires and queues some content for stations that are not currently being listened to, refreshing that content as needed to avoid the queued content becoming "stale." In at least one embodiment, content acquisition module 414 includes an RSS (Rich Site Summary or Really Simple Syndication) reader 416 that obtains Internet content from the web feeds of various web sites in Internet 130.

The textual Internet content accessed by content acquisition module 414 is optionally but preferably converted into synthesized human speech by a text-to-speech converter 418 executing within server application 404 or within a separate application executing on server computer system 132 or a third party service provider 136. As noted above, in an alternative embodiment, text-to-speech conversion can alternatively be performed by a text-to-speech converter 314 executing on a data processing system 200. As described above with reference to text-to-speech converter 314 of client application 304, text-to-speech converter 418 of server application 404 may further be configured to translate textual content not already in a user-selected receptor language.

As further shown in FIG. 4, server application 404 includes a station streamer module 420 that streams tracks of Internet content retrieved by content acquisition module 414 (preferably in audio format and after conversion to synthesized human speech by text-to-speech converter 418) to client applications 304 and/or browsers 306 executing on the data processing systems 200 of various users via the appropriate stations identified in user station database 412. As described further below, in some embodiments, a presentation mode of each station can be individually configured in either a continuous play mode in which station streamer module 420 progresses the play pointer 413 (at an appropriately selected rate) through tracks of Internet content assigned to a station regardless of whether or not any users are presently listening to that station, or a pause play mode in which station streamer module 420 progresses play pointer 413 through a sequence of tracks of Internet content queued for a particular station only when a user is listening to the station and otherwise pauses presentation of the sequence of tracks (i.e., temporarily halts updates to play pointer 413) until the user again listens to the station to which the tracks are queued.

Server application finally includes a front end communication module 422 and an optional ad manager 424. Front end communication manager 422 handles all incoming communication received from client applications 304 and/or browsers 306 via HTTP server 406. Thus, for example, front end communication module 422 receives and acts upon requests to change stations or to update application settings, presentation modes, user preferences, station content, etc. Ad manager 424, if present, places audio and/or multimedia advertisements in the streams of tracks of Internet content transmitted by station streamer module 420 to data processing systems 200. Ad manager 424 can select the advertisements based on, for example, the user subscription level (e.g., higher subscription prices may have fewer advertisements), user preferences, station content, and contextual information received from contextual awareness module 320. For example, ad manager 424 may include, within the stream of tracks to be transmitted to a given user, restaurant and/or hotel advertisements based on a time of day and a GPS or network location, directional heading, or other input reported by contextual awareness module 320. Similarly, if the user is listening to a Home Improvement station, ad manger 424 may include within the stream of tracks for the Home Improvement station advertisements for appliances or home remodeling services based on the station content.

Figure 5:
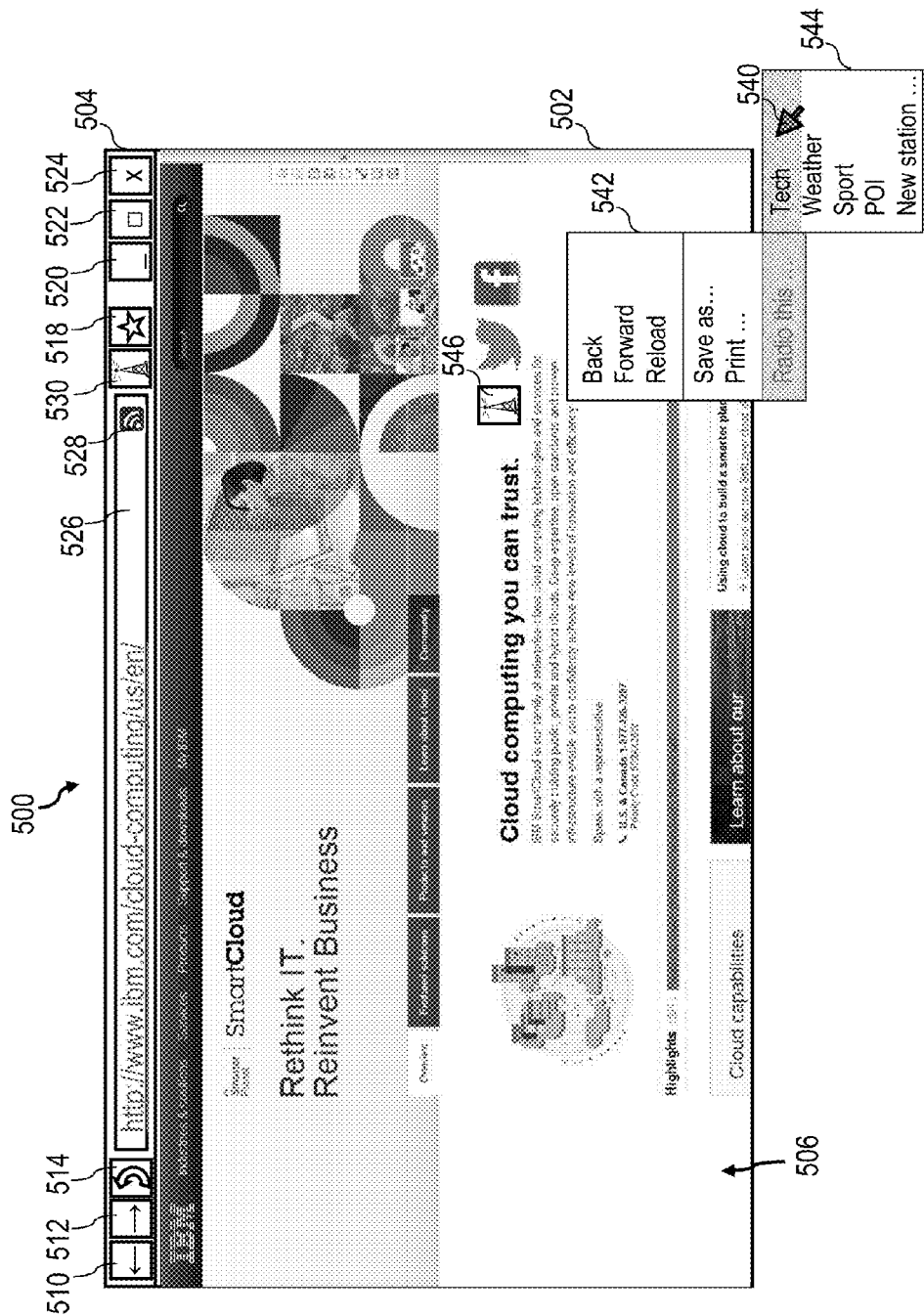
FIG. 5 illustrates an exemplary graphical user interface of a browser application through which textual content of an Internet resource can be selected for audio presentation.

With reference now to FIG. 5, there is illustrated an exemplary graphical user interface of a browser 306 through which textual content of an Internet resource can be selected for audio presentation as synthesized human speech. Graphical user interface 500 includes a window 502 having a toolbar 504 and a display pane 506. Toolbar 504 includes conventional browser features, such as a back button 510, forward button 512, reload button 514, favorites (bookmark) button 518, as well as window controls, such as minimize button 520, maximize button 522 and close button 524. Toolbar 526 further includes an address and search field 526 in which IP addresses or URLs (Universal Resource Locators) can be entered to cause browser 306 to present a desired web page within display pane 506, or into which textual search terms may be entered to invoke operation of a search engine to compile a results page containing a hyperlinked list of resources of possible interest. When a web page that offers an RSS feed is presented in display pane 506, address and search field 526 includes RSS icon 528 to indicate a RSS feed is available for that particular web page.

In accordance with some embodiments, toolbar 504 of browser 306 is modified, for example, by a browser plug-in or extension, to enable a user to designate textual content of Internet resources for audio presentation via the audio presentation service supported by server application 404. For example, in some embodiments, the user can select RSS icon 528 (e.g., utilizing cursor 540 or a touch input) to open a dialog box that includes the option to add the RSS feed of the displayed web page to a desired station of the user. Alternatively or additionally, the user can add all the textual content of the displayed web page to a desired station of the user by selecting a station button 530 on toolbar 504. Alternatively or additionally, the user can add only selected textual content of the webpage presented in display pane 506 to a desired station by right-clicking or otherwise selecting textual content of webpage and then navigating a primary pop-up window 542 and secondary pop-up window 544 to designate the desired station (e.g., Tech).

In addition to the three modalities of selection of textual content of an Internet resource for audio presentation as synthesized human speech noted above (which all rely on modification of the interface of a conventional browser), the user may alternatively or additionally add selected textual content of the webpage presented in display pane 506 to a desired station by selecting a share-to-station icon 546 embedded in the web page itself. Thus, web page publishers can encourage audio presentation of their textual content, even if a user's browser lacks an explicit tool to add the textual content to a station. Such web page publishers may also choose to provide an already-converted-to-speech version of the content, for delivery through a third-party service provider 136.

Referring now to FIG. 6, there is depicted an exemplary graphical user interface 600 of a client application 304 or browser 306 though which a user can control the audio presentation of textual content of an Internet resource. Graphical user interface 600 can be presented in the display 224 of a data processing system 200, for example, in response to the user opening client application 304 (e.g., by selecting an associated icon on a desktop) or by navigating to a player page of a service website on server computer system 132 utilizing browser 306 of data processing system 200.

Graphical user interface 600 includes a number of fields, buttons and controls by which a user can manage their personal and/or shared stations, add content to stations and/or control the listening experience. Although exemplary fields, buttons and controls are illustrated and described, those skilled in the art will appreciate that the described functionality can alternatively be achieved through multiple GUI screens (rather than a single one as shown) and can optionally employ different numbers and/or types of GUI elements.

In the depicted example, a user manages stations via text field 602 and buttons 604-608. In particular, the user can enter a station name into text field 602 and then add the station to the list of the user's personal stations maintained in user station database 412 by selecting add button 604 or delete the station from the list of the user's personal stations by selecting delete button 606. Further, the user can change of the presentation mode of the identified station between continuous play mode and pause play mode by toggling presentation mode button 608. As noted above, in the continuous play mode, station streamer module 420 progresses play pointer 413 through tracks of Internet content assigned to the selected station regardless of whether or not the user is presently listening to that station. Station streamer module 420 can control the rate at which it progresses play pointer 413 through the content queued on the station based on the rate at which content is being added to the station. In contrast, in the pause play mode, station streamer module 420 progresses play pointer 413 through a sequence of tracks of Internet content queued to the selected station only when the user is listening to the station and otherwise pauses presentation of the sequence of tracks (and temporarily halts updates to play pointer 413) until the user again listens to the station. These presentation modes are further described below with reference to FIG. 8.

In the depicted example, a user can add content to a station via text fields 610-614. (These fields can be utilized to supplement the direct selection of textual content described above with reference to FIG. 5.) For example, the user enters the station name in text field 610 and then designates content for addition to the station by entering an IP address, URL or the name of a bookmark of browser 306 in text field 612. The user can alternatively or additionally designate content for addition to the station by entering keywords in text field 614. It should be understood that the Internet content can include the user's own "library" of content, residing either on the user's data processing system 200, on a network-accessible drive, or in the cloud. Thus, for example, the Internet content may include, but preferably is not restricted to, the user's own email messages, Twitter feed, documents, e-books, etc. In response to entry of information in field 612 and/or field 614, client application 304 or browser 306 passes the information entered in field 612 and/or 614 to server application 404. Content acquisition module 414 of server application 404 then utilizes the information to search for and/or to access additional textual Internet content for presentation on the selected station of the user.

The user can control his or her individual listening experience for a particular station utilizing controls 620-664. (That is, settings of controls 620-644 are preferably customizable on a station-by-station basis, but in some embodiments can be applied to multiple of the user's stations.) In text field 620, the user enters the name of station to which the user desires to listen. In response to entry of a valid station name in text field 620, client application 304 or browser 306 communicates the station name and a presentation request to server application 404, which responds by causing station streamer module 420 to stream a sequence of tracks of Internet content to the user's data processing system 200 for presentation by audio presentation module 312 of client application 304 or by browser 306. The user can mute or un-mute the station by toggling mute button 622 and can further adjust the volume of the presentation utilizing slider 624. The user can also control the speed/rate of playback using slider 625.

In accordance with a preferred embodiment, the user can control the subject matter depth and duration of a presentation of the content associated with a selected station utilizing controls 626-636. For example, using slider 626 the user can control the default subject matter depth of the selected station. In response to selection of a smaller depth, station streamer module 420 presents fewer and/or shorter tracks regarding the general subject matter associated with the selected station, and conversely station streamer module 420 presents more and/or longer tracks regarding the general subject matter associated with the selected station in response to selection of a greater depth. If the station to which the user is listening is currently presenting a track of particular interest to the user, the user may select In Depth Now button 630 to cause content acquisition module 414 to acquire and station streamer module 420 to stream more in-depth content related to the specific subject matter of the current track. For example, if the selected station is a History channel and the current track mentions a historical figure, the user can select In Depth Now button 630 to request server application 404 to provide more in-depth information regarding the historical figure, which may be, for example, a biographical sketch from an Internet encyclopedia.

The user may also desire to limit the scope of information provided on a given topic, either due to time limitations or desire for greater breadth at the expense of depth. In such cases, the user may utilize slider 634 to indicate a level of automated content summarization to be applied to the Internet content prior to presentation. In various embodiments, the automated content summarization can be performed by client application 304, server application 404 or a third party service provider 136. The user may also enter a desired audio program duration in text field 636, which may correspond, for example, to the anticipated duration of an automobile trip. In response to receipt of the desired program duration, station streamer module 420 may tailor the length, depth and summarization of a collection of tracks of Internet content to achieve the desired overall audio program duration.

If the user wants to gauge his or her interest in listening to the station, the user may also toggle Sample Now button 632. In response to the user toggling button 632, station streamer module 420 streams a brief snippet (e.g., 5-10 s) of each of multiple (e.g., 5-10) tracks queued for presentation on that station. Based on interest in the snippets presented, the user can then decide to change the station using text field 620 or can again toggle button 632 to cause station streamer module 420 to begin full presentation of the tracks that were sampled. One exemplary implementation of the track sampling feature of the audio presentation service is described below in greater detail with reference to FIG. 9.

GUI 600 further includes radio buttons 644 that permit the user to select either a male or female voice for rendering the synthesized speech presentation of the Internet content. The user can further adjust the degree of emotional inflection in the synthesized speech utilizing slider 646. If the user desires to hear tracks related to a variety of different subject matter, the user can cause station streamer module 420 to "shuffle" tracks between stations by toggling shuffle button 640. The user can also cause station streamer module 420 to replay a track from the beginning or skip to the next track by selecting buttons 650 and 656, respectively. The user can confirm interest in the subject matter of a track by selecting button 654, or if a track is not of interest can so indicate by selecting button 652. Content acquisition module 414 can select additional Internet content to acquire based on the level of user interest reflected by the inputs received via buttons 652-654. If the user wants to associate content currently being presented and related content with a new or different station, the user can redirect such content by selecting button 664, which opens a control that enables the user to specify the new or existing station on which the content is to be presented. In this manner, the user is able to craft and curate the content of each station in accordance with his or her individual preferences.

GUI 600 finally preferably includes controls that control the influence of context on the listening experience. In the illustrated example, GUI 600 includes radio buttons 660 that enable the user to enable and disable the inclusion of station content selected based at least in part on contextual awareness information (e.g., reported by contextual awareness module 320). The user may further control the relative priority of contextually influenced content, when enabled, with respect to other content utilizing slider 662. Thus, for example, at lower levels of contextual priority, a contextually influenced track (e.g., a restaurant review of a nearby restaurant) may only be presented if the user is listening to a station playing related content (e.g., a Local Attractions station). However, at higher levels of contextual priority, a contextually influenced track (e.g., mapping service directions to a chosen destination (e.g., "Take the exit to the right.") or information regarding a nearby historical site) make "break in" to the regular stream of tracks of the station currently being listened to, regardless of its content.

With reference now to FIG. 7, there is illustrated a high level block logical flowchart of an exemplary method of audio presentation of textual content of an Internet resource as synthesized human speech in accordance with one embodiment. The process begins at block 700 and the proceeds to block 702, which illustrates a user curating the content of one or more stations, for example, utilizing GUI 600 of FIG. 6 to provide the relevant inputs to server application 404. The curation of the station(s) enables the user to develop and maintain personalized stations each providing a respective stream of tracks of relevant Internet content. At block 704, content acquisition module 414 of server application 404 accesses textual Internet content relevant to the user and associates the Internet content with one or more stations, and then station streamer module 420 streams tracks of content associated with at least one station to the user's data processing system 200. As further noted in block 704, the textual Internet content is also transformed into synthesized speech (and optionally translated), for example, by text-to-speech converter 418 or 314. Following conversion into synthesized speech, the tracks of Internet content associated with a currently selected station are presented to the user, for example, by browser 306 or audio presentation module 312 of client application 304.

Referring now to FIG. 8, there is depicted a high-level block logical flowchart of an exemplary method of controlling a presentation mode of an audio presentation of textual content of an Internet resource. The process begins at block 800 and then proceeds to block 802, which depicts server application 404 initializing a given station of a user to a default presentation mode, such as the continuous play mode, and then recording the presentation mode in user station database 412. As indicated at block 804 and 806, while a station is in the continuous play mode, station streamer module 420 progresses play pointer 413 through tracks of Internet content assigned to the station at a predetermined rate (e.g., a simulated rate at which the content would be presented in audio format) regardless of whether or not the user is presently listening to that station. In this manner, the station follows the paradigm of conventional over-the-air broadcast media, such as radio and television.

In response to front end communication module 422 of server application 404 receiving a request to change the presentation mode (e.g., where the mode change request is generated in response to the user toggling button 608 of GUI 600) at block 804, server application 404 modifies the presentation mode of the station in user database 412 to the pause play mode, as shown at block 810. While the station is configured in the pause play mode, station streamer module 420 progresses play pointer 413 through a sequence of tracks of Internet content queued to the station only while the station is selected for presentation, and otherwise pauses presentation of the sequence of tracks (and temporarily halts updates to play pointer 413) until the user again selects the station, as illustrated at blocks 812-816. In response to server application 404 receiving a mode change request for a station in the pause play mode, the process of FIG. 8 returns to block 802, which has been described.

With reference now to FIG. 9, there is depicted a high level logical flowchart of an exemplary method of presenting a variable-depth audio presentation of textual content of an Internet resource. The process begins at block 900 in response to receipt by server application 404 of an input from a user's data processing system 200. The process then proceeds to block 902, which illustrates server application 404 determining whether or not a sample input has been received, for example, in response to a user selecting Sample Now toggle button 632 in GUI 600 of FIG. 6. In response to server application 404 determining at block 902 that the received input is not a sample input, the process passes to block 930, which is described below.

Returning to block 902, in response to server application 404 determining that a sample input has been received, station streamer module 414 begins transmission, to the user's data processing system 200 for audio presentation to the user, a sequence of snippets (e.g., 5-10 s each) from multiple tracks in the sequence of tracks queued for the user's currently selected station (block 910). These snippets can also be summarized versions of the tracks, as obtained from an external third-party service 136 or from the content publisher. The process then proceeds to blocks 912-916, which illustrate server application 404 monitoring for the first to occur of any of three events, namely, receipt from the user's data processing system 200 of a full presentation input (e.g., toggling of Sample Now toggle button 632) requesting full presentation of one of the sampled tracks (block 912), the completion of transmission and/or presentation of all of the sequence of snippets (block 914), and receipt from the user's data processing system 200 of an input changing the station (block 916).

In response to a determination at block 916 that receipt of an input changing the station is the first event to occur, processing continues at block 924, for example, by station streamer module 420 beginning to stream full tracks of Internet content in a different station selected by the user. Thereafter, the process passes to block 942. However, in response to determining at block 912 that a full presentation input is first received, server application 404 initiates streaming of a sequence of full tracks in the currently selected station, beginning with the track from which a snippet was being presented when the user entered the full presentation input (block 920). Thereafter, processing continues at block 942.

In response to determining at block 914 that all snippets in the sequence of snippets have been presented prior to receipt of an input changing the station or an input requesting full presentation, server application 404 initiates streaming of a sequence of full tracks on the station, beginning with the first track from which an audio snippet was presented in response to the user entering the sample input (block 922). Thereafter, processing continues at block 942.

Referring now to block 930, while streaming a sequence of full tracks of Internet content to the user's data processing system 200 for audio presentation as synthesized human speech, server application 404 determines whether or not an in-depth input has been received from the user's data processing system 200, for example, in response to the user selecting In Depth Now button 630. The in-depth input signifies the user's interest in receiving additional information regarding one of a plurality of items of specific information found in the current track. In response to a negative determination at block 930, the process passes to block 940, which is described below. However, in response to an affirmative determination at block 930, server application 404 causes content acquisition module 414 to acquire, and station streamer module 420 to stream, more in-depth content related to the subject matter of an item of specific information found in the current track, for example, one presented substantially contemporaneously with selection of In Depth Now button 630 (block 932). If contextual awareness is enabled via radio buttons 660, the selection of the subject matter of the more in-depth content can also be made based at least in part on contextual information, such as the location of the user's data processing system 200. In one embodiment, server application 404 selects the depth, for example, in terms of the number of supplementary tracks elaborating on the subject matter of the item of specific information, the duration of the supplementary tracks, and the summarization applied to the supplementary tracks, based on the setting specified by sliders 626 and 634 in GUI 600. Following presentation of the in-depth tracks, the presentation of the regular tracks of the more general Internet content on the station resumes, and the process continues at block 942.

Referring now to block 940, in response to server application 404 determining that the received input is neither a sample input nor an in-depth input, server application 404 performs other processing as appropriate for the received input.

At block 942, server application 404 determines whether the number of tracks that have been acquired by content acquisition module 414 for the station to which the user is currently listening and that remain to be streamed to the user's data processing system 200 is less than a lower threshold. If not, station streamer module 420 continues to stream tracks of the station to the user's data processing system 200, and the process continues at block 946. In response to a determination at block 942 that the number of acquired tracks that remain to be stream is less than the lower threshold, server application 404 causes content acquisition module 414 to automatically acquire and station streamer module 420 to stream additional tracks of Internet content related to the subject matter of the currently selected station (block 944). Thereafter, the process continues at block 946.

Referring now to FIG. 10, there is depicted a high level logical flowchart of an exemplary method of audibly presenting an automotive message in accordance with the embodiment. The illustrated process can be performed, for example, by a vehicle computer 106 (or another data processing system 200 that is in communication with vehicle computer 106) and that is executing client application 304 or browser 306 as previously described in order to provide an audio presentation of Internet content in the format of synthesized human speech.

The process of FIG. 10 begins at block 1000 and then proceeds to block 1002, which illustrates a client application 304 or browser 306 running on a data processing system 200 audibly presenting an synthesized human speech presentation of a stream of tracks of Internet content for a station currently selected by the user. As discussed above, the presentation can be made, for example, via speaker 220 of data processing system 200 or via PPS 110 of automobile 108. At block 1004, the client application 304 or browser 306 running on a data processing system 200 monitors for receipt of an automotive input. The automotive input may comprise, for example, travel directions from a mapping program or service, information concerning availability of roadside services or accommodations, automotive service or maintenance information (e.g., oil change notification, tire pressure, fuel or electric charge level), roadway information (e.g., current speed limit, roadway congestion notification, alternative route), safety notifications (e.g., lane departure warning notification, collision avoidance notification, adverse roadway or weather conditions, etc.). In the case of client application 304, automotive inputs can be received, for example, by contextual awareness module 320.

In response to a determination at block 1004 that no automotive input has been received, the client application 304 or browser 306 continues to present, in audio synthesized speech format, the stream of tracks of Internet content associated with the currently selected station, as shown at block 1002. In response to a determination at block 1004 that data processing system 200 has received an automotive input, client application 304 or browser 306 determines a priority of the automotive input at block 1006. For example, client application 304 or browser 306 may assign safety notifications a high priority that mandates immediate presentation on any of the user's stations and thus interruption of the current track currently being presented no matter which station is being presented. In some embodiments, roadway information or travel directions may be assigned a medium priority that indicates presentation of the automotive input following the conclusion of the current track. Routine service or maintenance information may be assigned a lower priority that allows presentation to be deferred up to a predetermined time interval (e.g., two hours) or until the user changes station. In at least some embodiments, the user can specify priorities for one or more classes of automotive inputs and can further associate particular automotive inputs with the classes. User behavior upon playback of automotive input messages can also be used to guide the system to automatically learn the priority associated with messages and stations.

At block 1008, client application 304 or browser 306 schedules and audibly presents (e.g., utilizing predetermined tracks of synthesized speech or an audible alarm sound) the automotive input in the current station based on the priority of the automotive input determined at block 1006. Thereafter, the process of FIG. 10 continues at block 1010.

As has been described, in some embodiments, each of a plurality of stations has a respective sequence of tracks of Internet content of common subject matter and a respective play pointer indicating a location in the sequence of tracks. In response to a first input, the presentation mode of the station is configured in a continuous play mode in which the play pointer is progressed through the sequence of tracks queued to the station regardless of whether or not the station is presently selected for presentation. In response to a second input, the presentation mode is configured in a pause play mode in which the play pointer is progressed through the sequence of tracks queued to the station only while the station is selected for presentation to a user and otherwise pauses progression of the play pointer. The processor transmits tracks of the station and progresses the play pointer in accordance with the configured presentation mode.

In at least some embodiments, a respective sequence of tracks of Internet content of common subject matter is queued to each of a plurality of stations, where each of the tracks of Internet content resides on a respective Internet resource in textual form. In response to receiving a sample input, snippets of each of multiple tracks queued to a selected station among the plurality of stations is transmitted for audible presentation as synthesized human speech, where each of the snippets includes only a subset of a corresponding track. Thereafter, one or more complete tracks among the multiple tracks for which snippets were previously transmitted are transmitted for audio presentation as synthesized human speech.

In at least some embodiments, a selected track among the sequence of tracks queued to a selected station among the plurality of stations includes multiple items of specific information all related to the common subject matter of the selected station. In response to receiving an in-depth input during presentation of the selected track as synthesized human speech, automatically searching for and accessing additional textual Internet content concerning one of the multiple items of specific information and queuing the additional Internet content to the selected station for presentation in one or more additional tracks.

While the present invention has been particularly shown as described with reference to one or more preferred embodiments, it will be understood by those skilled in the art that various changes in form and detail may be made therein without departing from the spirit and scope of the invention. For example, although embodiments have been disclosed with reference to an exemplary data processing environment in which provision of the audio presentation service employs a distributed client-server paradigm in which a portable data processing system (e.g., mobile phone, client computer system or vehicle computer system) implements the client and a possibly conventional server computer hardware can be utilized to implement the server, in alternative implementations the client-server paradigm of service provision can be adapted such that a mobile phone or other mobile data processing system can act as the "server" and the vehicle computer or another mobile data processing system can serve as the client. Alternatively, the disclosed audio presentation service can be implemented on a single data processing system implementing the functionality of both client application 304 and server application 404.

Further, although aspects have been described with respect to a data processing system executing program code that directs the functions of the present invention, it should be understood that present invention may alternatively be implemented as a program product including a storage device (e.g., DRAM, SRAM, EEPROM, ROM, flash memory, magnetic disk, optical disk, etc.) storing program code that can be processed by a data processing system. As employed herein, the term "storage device" should be construed according to its plain meaning as understood by those skilled in the art and is defined to exclude transient propagating signals per se. It should also be understood that the term "exemplary" means a characteristic or typical example of a feature, not necessarily the absolute best or most desirable example. Reference throughout this specification to "one embodiment," "an embodiment," or similar language means that a particular feature, structure, or characteristic described in connection with the embodiment is included in at least one embodiment of the present invention. Thus, the phrases "in one embodiment," "in an embodiment," and similar language throughout this specification may, but do not necessarily, all refer to the same embodiment.

What is claimed is:

1. A method of supporting a variable-depth presentation of Internet content in a data processing system including a processor, the method comprising:
 a processor of a server computer system queuing a respective sequence of tracks of Internet content of common subject matter to each of a plurality of stations, wherein each of the tracks of Internet content resides on a respective Internet resource in textual form, wherein a selected track among the sequence of tracks queued to a selected station among the plurality of stations includes multiple items of specific information all related to the common subject matter of the selected station;
 in response to receiving a sample input from a remote audio presentation device, the processor transmitting, via a network to the remote audio presentation device, snippets of each of multiple tracks queued to a selected station among the plurality of stations for audible presentation as synthesized human speech, wherein each of the snippets includes only a subset of a corresponding track;
 thereafter, the processor transmitting via the network to the remote audio presentation device for audio presentation as synthesized human speech, a plurality of complete tracks among the multiple tracks for which snippets were previously transmitted and presented audibly by the remote audio presentation device, wherein the processor transmits the plurality of complete tracks beginning with a track among the plurality of tracks from which a snippet was first presented audibly by the remote audio presentation device; and
 in response to receiving an in-depth input from the remote audio presentation device during presentation of the selected track as synthesized human speech, the processor automatically searching for and accessing additional textual Internet content concerning a particular item of specific information presented via text-to-speech substantially contemporaneously to receipt of the in-depth input and queuing the additional Internet content to the selected station for presentation in one or more additional tracks.

2. The method of claim 1, wherein the transmitting one or more complete tracks includes beginning transmission of the one or more complete tracks beginning with a track from which a snippet was being presented when the sample input was received.

3. The method of claim 1, and further comprising selecting which of the multiple items of specific information about which to access additional textual Internet content based at least in part on contextual information reported by the remote audio presentation device, wherein the contextual information includes at least one of location information and time of day information.

4. The method of claim 1, and further comprising:
in response to a number of tracks queued to a selected station among the plurality of stations satisfying a low threshold, automatically searching for and accessing additional textual Internet content related to the common subject matter of the selected station and queuing the additional Internet content to the selected station for presentation in one or more additional tracks.

5. A data processing system supporting a variable-depth presentation of Internet content, comprising:
a processor; and
a storage device coupled to the processor, wherein the storage device includes program code that, when executed by the processor, causes the data processing system to perform:
queuing a respective sequence of tracks of Internet content of common subject matter to each of a plurality of stations, wherein each of the tracks of Internet content resides on a respective Internet resource in textual form, wherein a selected track among the sequence of tracks queued to a selected station among the plurality of stations includes multiple items of specific information all related to the common subject matter of the selected station;
in response to receiving a sample input from a remote audio presentation device, transmitting snippets of each of multiple tracks queued to a selected station among the plurality of stations for audible presentation by the audio presentation device as synthesized human speech, wherein each of the snippets includes only a subset of a corresponding track;
thereafter, transmitting via the network to the remote audio presentation device for audio presentation as synthesized human speech, a plurality of complete tracks among the multiple tracks for which snippets were previously transmitted and presented audibly by the remote audio presentation device, wherein the program code causes the data processing system to transmit the plurality of complete tracks beginning with a track among the plurality of tracks from which a snippet was first presented audibly by the remote audio presentation device; and
in response to receiving an in-depth input from the remote audio presentation device during presentation of the selected track as synthesized human speech, the processor automatically searching for and accessing additional textual Internet content concerning a particular item of specific information presented via text-to-speech substantially contemporaneously to receipt of the in-depth input and queuing the additional Internet content to the selected station for presentation in one or more additional tracks.

6. The data processing system of claim 5, wherein the transmitting one or more complete tracks includes beginning transmission of the one or more complete tracks beginning with a track from which a snippet was being presented when the sample input was received.

7. The data processing system of claim 5, wherein the program code, when executed, further causes the data processing system to perform:
selecting which of the multiple items of specific information about which to access additional textual Internet content based at least in part on contextual information reported by the remote audio presentation device, wherein the contextual information includes at least one of location information and time of day information.

8. The data processing system of claim 5, wherein the program code, when executed, further causes the data processing system to perform:
in response to a number of tracks queued to a selected station among the plurality of stations satisfying a low threshold, automatically searching for and accessing additional textual Internet content related to the common subject matter of the selected station and queuing the additional Internet content to the selected station for presentation in one or more additional tracks.

9. The data processing system of claim 5, wherein the data processing system comprises a mobile phone.

10. The data processing system of claim 5, wherein the data processing system comprises a server computer system.

11. A program product supporting a variable-depth presentation of Internet content, comprising:
a storage device;
program code stored in the storage device that, when executed by a processor of a server computer system, causes the server computer system to perform:
queuing a respective sequence of tracks of Internet content of common subject matter to each of a plurality of stations, wherein each of the tracks of Internet content resides on a respective Internet resource in textual form, wherein a selected track among the sequence of tracks queued to a selected station among the plurality of stations includes multiple items of specific information all related to the common subject matter of the selected station;
in response to receiving a sample input from a remote audio presentation device, transmitting, via a network to the remote audio presentation device, snippets of each of multiple tracks queued to a selected station among the plurality of stations for audible presentation as synthesized human speech, wherein each of the snippets includes only a subset of a corresponding track;
thereafter, transmitting via the network to the remote audio presentation device for audio presentation as synthesized human speech, a plurality of complete tracks among the multiple tracks for which snippets were previously transmitted and presented audibly by the remote audio presentation device, wherein the program code causes the server computer system to transmit the plurality of complete tracks beginning with a track among the plurality of tracks from which a snippet was first presented audibly by the remote audio presentation device; and
in response to receiving an in-depth input from the remote audio presentation device during presentation of the selected track as synthesized human speech, the processor automatically searching for and accessing additional textual Internet content concerning a particular item of specific information presented via text-to-speech substantially contemporaneously to receipt of the in-depth input and queuing the additional Internet content to the selected station for presentation in one or more additional tracks.

12. The program product of claim 11, wherein the transmitting one or more complete tracks includes beginning transmission of the one or more complete tracks beginning with a track from which a snippet was being presented when the sample input was received.

13. The program product of claim 11, wherein the program code, when executed, further causes the data processing system to perform:
   selecting which of the multiple items of specific information about which to access additional textual Internet content based at least in part on contextual information reported by the remote audio presentation device, wherein the contextual information includes at least one of location information and time of day information.

14. The program product of claim 11, wherein the program code, when executed, further causes the data processing system to perform:
   in response to a number of tracks queued to a selected station among the plurality of stations satisfying a low threshold, automatically searching for and accessing additional textual Internet content related to the common subject matter of the selected station and queuing the additional Internet content to the selected station for presentation in one or more additional tracks.

\* \* \* \* \*